US009718364B2

(12) United States Patent
Fetzer et al.

(10) Patent No.: US 9,718,364 B2
(45) Date of Patent: Aug. 1, 2017

(54) DRIVE SYSTEM FOR AN ELECTRIC VEHICLE AND METHOD FOR CHARGING A BATTERY WITH A COMBUSTION ENGINE

(71) Applicants: Robert Bosch GmbH, Stuttgart (DE); Samsung SDI Co., Ltd., Yongin-si, Gyeonggi-do (KR)

(72) Inventors: Joachim Fetzer, Bad-Ditzenbach (DE); Stefan Butzmann, Schalksmühle (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/416,285

(22) PCT Filed: Jul. 11, 2013

(86) PCT No.: PCT/EP2013/064646
§ 371 (c)(1),
(2) Date: Jan. 22, 2015

(87) PCT Pub. No.: WO2014/016126
PCT Pub. Date: Jan. 30, 2014

(65) Prior Publication Data
US 2015/0175014 A1    Jun. 25, 2015

(30) Foreign Application Priority Data

Jul. 26, 2012 (DE) .................. 10 2012 213 129

(51) Int. Cl.
*H02P 1/00* (2006.01)
*B60L 11/18* (2006.01)
(Continued)

(52) U.S. Cl.
CPC .............. *B60L 11/18* (2013.01); *B60L 11/12* (2013.01); *B60L 11/123* (2013.01);
(Continued)

(58) Field of Classification Search
CPC . Y02T 10/7005; Y02T 10/7077; Y02T 10/70; B60W 10/08; B60W 20/00
(Continued)

(56) References Cited

U.S. PATENT DOCUMENTS 6,058,032 A * 5/2000 Yamanaka .......... B60L 11/1803
318/768
2009/0171523 A1 * 7/2009 Luo ........................ B60K 6/405
701/22
2011/0198936 A1    8/2011 Graovac et al.

FOREIGN PATENT DOCUMENTS

DE    10 2007 004 172 A1    7/2008
DE    10 2009 001 705 A1    9/2010
(Continued)

OTHER PUBLICATIONS

International Search Report corresponding to PCT Application No. PCT/EP2013/064646, mailed Oct. 21, 2013 (German and English language document) (5 pages).

*Primary Examiner* — Kawing Chan
*Assistant Examiner* — Bradley Brown
(74) *Attorney, Agent, or Firm* — Maginot, Moore & Beck LLP

(57) ABSTRACT

The disclosure relates to a drive system for an electric vehicle, comprising an electric motor, a traction battery for supplying the electric motor, an asynchronous machine, and a combustion engine for driving the asynchronous machine, wherein the asynchronous machine is arrange for charging the traction battery upon a control signal to extend the range of the electric vehicle. The traction battery has a plurality of a battery lines having adjustable output voltage for generating voltage progressions which are phase-shifted relative to one another, and each battery pack line is not only provided for supplying one of the phase connections of the electric motor but is also connected to a phase connection of (Continued)

the asynchronous machine. The disclosure further relates to a corresponding method for charging a traction battery having a plurality of battery lines by means of an asynchronous machine and a combustion engine disposed in series therewith.

5 Claims, 2 Drawing Sheets

(51) Int. Cl.
*B60L 11/12* (2006.01)
*H02J 7/14* (2006.01)
*B60W 10/08* (2006.01)

(52) U.S. Cl.
CPC ....... *B60L 11/1853* (2013.01); *B60L 11/1864* (2013.01); *H02J 7/14* (2013.01); *B60L 2220/12* (2013.01); *B60W 10/08* (2013.01); *Y02T 10/6217* (2013.01); *Y02T 10/7005* (2013.01); *Y02T 10/7061* (2013.01); *Y02T 10/7077* (2013.01)

(58) Field of Classification Search
USPC ......................................................... 318/139
See application file for complete search history.

(56) References Cited

FOREIGN PATENT DOCUMENTS

| DE | 10 2010 031 159 A1 | 1/2012 |
| DE | 10 2010 041 068 A1 | 3/2012 |
| DE | 10 2010 041 075 A1 | 3/2012 |
| DE | 10 2010 064 325 A1 | 7/2012 |
| WO | 2012/038184 A2 | 3/2012 |

* cited by examiner

DRIVE SYSTEM FOR AN ELECTRIC VEHICLE AND METHOD FOR CHARGING A BATTERY WITH A COMBUSTION ENGINE

This application is a 35 U.S.C. §371 National Stage Application of PCT/EP2013/064646, filed on Jul. 11, 2013, which claims the benefit of priority to Serial No. DE 10 2012 213 129.9, filed on Jul. 26, 2012 in Germany, the disclosures of which are incorporated herein by reference in their entirety.

The present disclosure relates to a drive system for an electric vehicle having an electric motor, a traction battery for supplying the electric motor, and an asynchronous machine, and having an internal combustion engine for the purpose of driving the asynchronous machine. In particular, the disclosure relates to a drive system for an electric motor in which an asynchronous machine is arranged so as to charge the traction battery in response to a control signal for the purpose of extending the range of the electric vehicle. In addition, the disclosure relates to a method for charging a traction battery that comprises multiple battery strings, wherein the traction battery is charged by means of an asynchronous machine and an internal combustion engine that is arranged in series with said asynchronous machine.

BACKGROUND

Motor vehicles having an electric motor such as electric cars or hybrid vehicles are known. In particular batteries using lithium-ion technology are suitable as energy storage devices for electric vehicles. These batteries are characterized amongst other characteristics by virtue of a high energy density and also an extremely low self-discharge. Vehicles can be driven by means of an electric machine that is embodied as a multiphase, preferably three-phase, electric motor and is supplied by the traction battery, in particular the lithium-ion traction battery.

Currently, electric vehicles generally have shorter ranges of travel than vehicles having an internal combustion engine as a result of a limited battery capacity and a limited charge rate and said electric vehicles are often only ready for further use after a comparatively longer charging period of by way of example one to two hours. For this reason it is often necessary to fall back on so-called "range extenders" (REX). The term "range extender" (also described as a "device that extends the range of the vehicle") is understood to mean in the case of an electric vehicle an additional unit with which the range of the vehicle can be increased. In this manner, it is possible to use an internal combustion engine, which is installed in an electric vehicle, for the purpose of driving a generator by means of which the traction battery is charged. Alternatively or in addition, the energy from the internal combustion engine can also be used to drive the vehicle. It is possible for the purpose of charging the battery to select a uniform operation for the internal combustion engine and the generator and consequently an optimal operating point is maintained, whereby the level of efficiency of the range extender is improved.

DE 10 2009 001 705 A1 discloses an electric vehicle having a battery charging device in which an internal combustion engine that is arranged as a range extender is started by means of energy that is provided by means of the battery charging device. The battery charging device is preferably embodied in a bidirectional manner.

DE 10 2007 004 172 A1 discloses a drive system for a vehicle that comprises an electric motor. In addition, an internal combustion engine and a generator that is connected in series to said internal combustion engine is provided and the traction battery of the electric motor is charged by means of said generator.

DE 10 2010 031 159 A1 discloses a range extender in the form of an internal combustion engine and an asynchronous machine. In the generator operation, the traction battery is charged by way of an interconnected rectifier by means of the asynchronous machine that is driven by means of an internal combustion engine. In the motor driven operation, the asynchronous machine is supplied by a traction battery by way of an inverter and can be used to start and accelerate the internal combustion engine.

In addition, traction batteries having multiple, in particular three, battery strings have been disclosed in earlier patent applications of the applicant. These battery strings can be switched in such a manner that they are phase-offset with a specific frequency, wherein each of the battery strings supplies one of the connecting terminals of a multiphase electric motor. Batteries of this type having multiple battery strings that are operated in a manner phase-offset with respect to one another are also described as battery direct inverters.

If a drive system having a multi-string traction battery of this type is operated with a range extender, the difficulty or rather the problem however that is to be overcome is that not only one but rather by way of example three battery strings are provided that all need to be charged.

SUMMARY

The disclosure provides a drive system for an electric vehicle that comprises an electric machine, a traction battery for the purpose of supplying the electric machine, an asynchronous machine and an internal combustion engine for the purpose of driving the asynchronous machine. The asynchronous machine is arranged so as to charge the traction battery in response to a control signal for the purpose of extending the range of the vehicle. The traction battery comprises multiple battery strings having an adjustable output voltage for the purpose of generating voltage curves that are phase-offset with respect to one another. Each battery string is provided both for the purpose of supplying one of the phase connectors of the electric machine as well as being connected to a phase connector of the asynchronous machine.

In addition, a method for charging a traction battery that comprises multiple battery strings is provided in which method the traction battery is charged by means of an asynchronous machine and an internal combustion engine that is arranged in series with said asynchronous machine. The traction battery is controlled so as to generate output voltages that are phase-offset with respect to one another and have a predefined and/or variable frequency by means of the battery strings for the purpose of controlling an electric motor. In addition, the asynchronous machine is operated in accordance with the method by means of the internal combustion engine with a frequency that is higher than the frequency of the three-phase traction battery so that a negative slip prevails in the asynchronous machine.

In accordance with one aspect of the disclosure, in addition a motor vehicle, in particular a hybrid or electric car, is provided and said motor vehicle is equipped with the drive system in accordance with the disclosure.

Consequently, in accordance with the disclosure, a circuitry topology for an electrical drive having a range extender is proposed in which the asynchronous machine is connected to the traction battery in a direct manner so as to charge the traction battery. More precisely, a connection of the traction battery is provided in such a manner that in particular one or multiple rectifiers can be omitted. This is achieved in accordance with the disclosure in particular by virtue of the fact that the outputs of the battery module strings are connected directly to the phase connectors of the asynchronous machine that is operated by the internal combustion engine. Consequently, in the case of suitably selecting the frequency, the asynchronous machine can work as a generator that simultaneously charges all the battery strings.

It is preferred that the outputs of the battery module strings are likewise connected directly to the terminals of the electric motor. As a consequence, the disclosure is advantageously applied to a battery direct inverter that is charged in accordance with the disclosure in a direct manner by means of the asynchronous motor.

The disclosure is in particular advantageously applied to a three-phase electric motor and a corresponding three-phase asynchronous machine, wherein the traction battery is correspondingly likewise three-phase or rather comprises three switched battery strings. Consequently in the case of this embodiment, three battery string outputs, by way of example the three positive battery string outputs, are connected in each case to precisely one of the three phase connectors of the electric motor and simultaneously to in each case precisely one of the three phase connectors of the asynchronous motor.

The drive system preferably has a control unit that ensures that the asynchronous machine is operated with a rotational speed or output frequency that is higher than the frequency of the switching of the multiphase traction battery, whereby a reliable charging process of the battery strings of the traction battery can be ensured by means of the asynchronous machine.

The electric motor in accordance with the disclosure can be an asynchronous motor or a synchronous motor.

In the case of one embodiment of the disclosure, the output voltages of the battery strings are achieved by virtue of the fact that the battery strings in each case comprise multiple battery modules that can be selectively activated or deactivated by means of the control process. Only in the activated state of a battery module does its battery module voltage contribute to an output voltage of the corresponding battery string.

In addition, it has proven to be a favorable construction if the battery modules comprise in each case two switches, of which in each case one is operated in the closed state and the other is operated in the open state. The switches are arranged in such a manner that depending upon the switching position of the switches of a respective battery module, the battery cells of the battery module are connected to the corresponding battery string or are bridged in a conductive manner in the battery string.

In accordance with the method in the case of a further development of the disclosure, a rotational speed of the asynchronous machine is regulated in such a manner that during the operation of the traction battery, the frequency with which the asynchronous machine is operated and the frequency of the traction battery are in a predetermined ratio with respect to one another, in particular in a fixed ratio. As a consequence, a further improved level of efficiency can be achieved.

It is preferred that the asynchronous machine and the electric motor are embodied and operated in such a manner that the relation $1.2\ n_M \leq n_{ASM} \leq 1.4\ n_M$ is maintained for a rotational speed $n_{ASM}$ of the asynchronous machine and a rotational speed $n_M$ of the electric motor.

It is preferred that the batter that is a lithium-ion battery.

BRIEF DESCRIPTION OF THE DRAWINGS

Exemplary embodiments of the disclosure are further explained with reference to the drawings and the following description. In the drawings.

DETAILED DESCRIPTION

Figure 1:
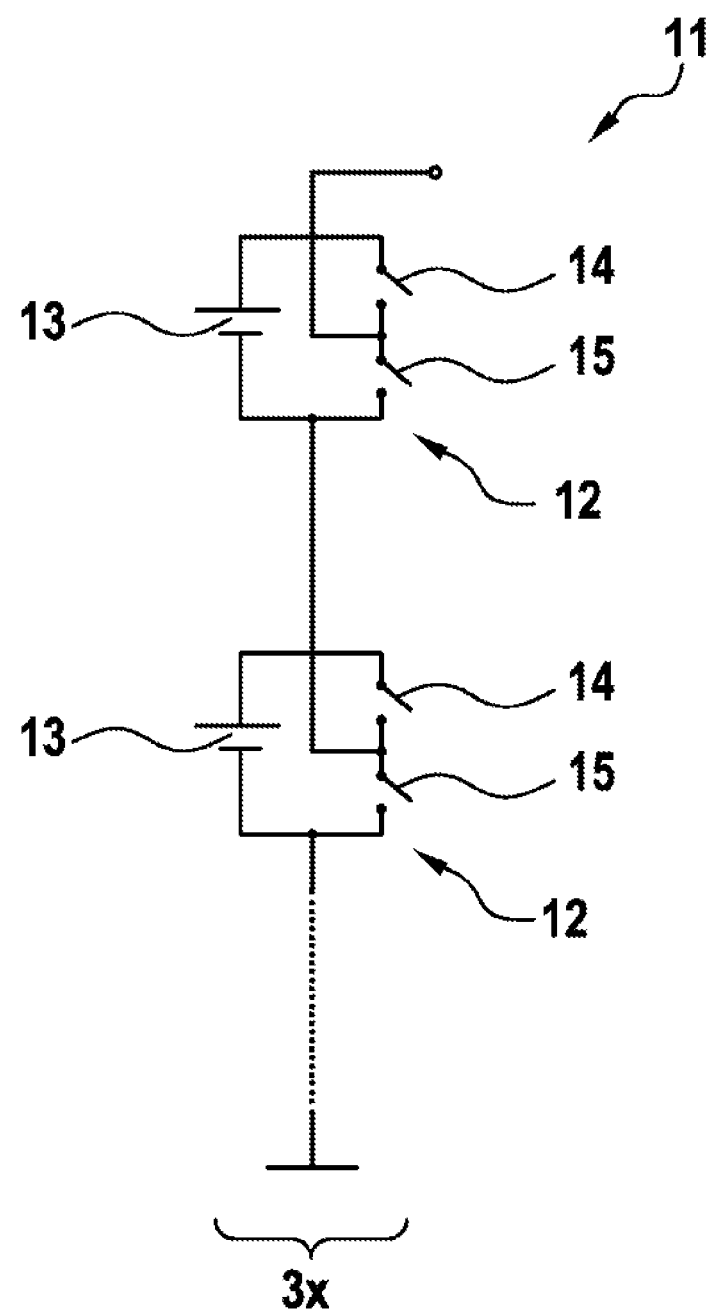
FIG. 1 illustrates a principal circuit diagram of a battery string with which it is possible to generate an adjustable output voltage, in accordance with an embodiment of the disclosure.

FIG. 1 illustrates a principal circuit diagram of a battery string 11 with which it is possible to generate an adjustable output voltage and with which the traction battery of the drive system in accordance with the disclosure can be charged. Three battery strings 11 of this type are preferably arranged in the traction battery. A battery string 11 comprises a multiplicity of battery modules 12 of which each comprises in each case at least one battery cell 13. The battery modules 12 are embodied in such a manner that they can be selectively connected to the battery string 11 so that the battery string 11 generates an adjustable output voltage. As is evident in FIG. 1, each battery module 12 comprises two switches 14, 15. If, in the case of a battery module 12, the switch 15 is opened and the switch 14 is closed, the battery module 12 is thus connected to the battery string 11 so that its battery module voltage contributes to the output voltage of the battery string 11. However, if the situation is reversed and the switch 15 is closed whereas the switch 14 is opened, the battery module 12 is thus bridged and no longer contributes to the battery string voltage, until it is reconnected. For this purpose, the battery modules 12 are controlled by a control unit (not illustrated in FIG. 1) and supplied with control signals in accordance with which individual battery modules 12 are switched or bridged in accordance with a predetermined sequence. As a consequence, by way of example a stepped voltage curve is generated with which a sinusoidal alternating voltage curve can be approximated. Although in the drawing only one battery cell 13 is illustrated per battery module 12, a battery module 12 can also comprise multiple battery cells 13. A wider distribution of the battery cells 13 of a battery string 11 amongst the individual battery modules 12, gives rise to a finer adjustment of the battery string output voltage. Multiple battery strings 11, preferably three, of this type are provided in the traction battery in accordance with the disclosure.

Figure 2:
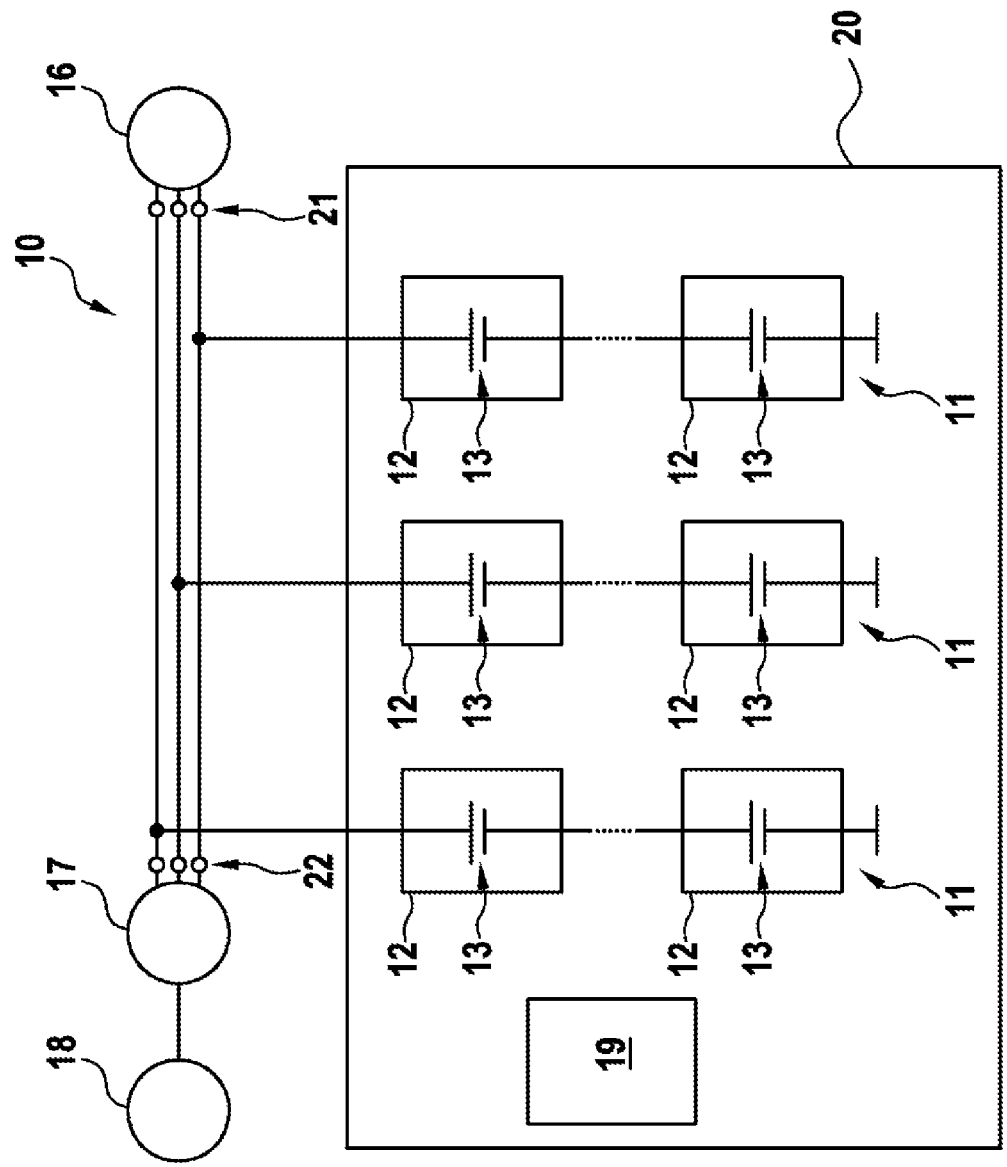
FIG. 2 illustrates a drive system in accordance with an embodiment of the disclosure in which a range extender is connected in series to an asynchronous generator.

FIG. 2 illustrates a drive system in accordance with an embodiment of the disclosure in which an internal combustion engine 18 that functions as a range extender is connected in series to an asynchronous generator 17. FIG. 2 illustrates both the battery strings 11 as well as the electric motor 16 that is supplied by the battery strings 11. In addition, a control unit 19 is arranged in the battery 20. The control unit is used for the purpose of generating the control signals for the battery module 12 or the switches accordingly. However, the disclosure is not limited to an embodiment of this type. Alternatively, the battery modules 12 can also be controlled by a central control device (not illustrated).

The battery strings 11 are connected with their outputs in each case to one of the phase connectors 21 of the electric motor 16 so that each phase connector 21 is supplied by precisely one battery string 11. For this purpose, the outputs of the battery strings 11 are connected to lines that in each case are coupled both to a phase connector 21 of the electric motor 16 as well as to a phase connector 22 of the asynchronous machine 17. By virtue of the fact that the traction battery 20 is coupled in this direct manner to the asynchronous machine 17, a charging process utilizing the asynchronous machine is rendered possible in a particularly simple manner. This can in particular occur without providing special, interconnected rectifiers. In a charging operation in which the internal combustion engine 18 that functions as a range extender is used and drives the asynchronous machine 17, the asynchronous machine 17 is operated in such a manner that a slip prevails in the asynchronous machine.

For this purpose, the rotational speed $n_{ASM}$ of the asynchronous machine is set slightly higher than the rotational speed $n_M$ of the electric motor or rather the frequency with which the electric motor is controlled. The electric motor can be a synchronous motor or an asynchronous motor. It is preferred that during operation of the traction battery, the frequency with which the asynchronous machine is operated and the frequency of the traction battery are in a predetermined ratio with respect to one another, in particular in a fixed ratio.

In an advantageous variant, the asynchronous machine and the electric motor are operated in such a manner that the relation $1.2\, n_M \leq n_{ASM} \leq 1.4\, n_M$ is maintained for the rotational speed $n_{ASM}$ of the asynchronous machine and the rotational speed $n_M$ of the electric motor during the operation of the traction battery 20 and the asynchronous machine 17 and the internal combustion engine 18.

The invention claimed is:

1. A drive system for an electric vehicle, the drive system comprising:
   an electric motor having a plurality of phase connectors;
   a traction battery configured to supply the electric motor, the traction battery comprising a plurality of battery strings having an adjustable output voltage, each battery string being configured to generate alternating current signals at a first predetermined frequency that are phase-offset with respect to one another and configured supply energy to one of the plurality of phase connectors of the electric motor;
   an asynchronous machine configured to extend a range of the electric vehicle by charging the traction battery in response to a control signal, the asynchronous machine having a plurality of phase connectors each connected directly to one of the plurality of battery strings and directly to one phase connector in the plurality of phase connectors in the electric motor;
   an internal combustion engine configure to drive the asynchronous machine; and
   a control unit operatively connected to the, internal combustion engine, asynchronous machine and the electric motor, the control unit being configured to:
      activate the internal combustion engine to drive the asynchronous machine; and
      regulate a rotational speed of the asynchronous machine to rotate the asynchronous machine at a second frequency that is at a predetermined ratio of the first frequency of the alternating current signals from the battery strings, the predetermined ratio being greater than 1 to enable an output signal from each phase connector in the asynchronous machine to drive the electric motor and charge one battery string in the plurality of battery strings.

2. The drive system as claimed in claim 1, wherein:
   the traction battery is a three-phase traction battery;
   the asynchronous machine is a three-phase asynchronous machine; and
   the electric motor is one of a three-phase asynchronous motor and a three phase synchronous motor.

3. The drive system as claimed in claim 1, wherein each battery string of the traction battery comprises a plurality of battery modules that are selectively activated and deactivated by a control process, wherein in an activated state, a battery module voltage of a respective battery module contributes to an output voltage of a corresponding battery string of the traction battery.

4. The drive system as claimed in claim 1, wherein each battery string of the traction battery comprises a plurality of battery modules, each battery module comprising two switches, a first switch of the two switches being operated in a closed state and a second switch of the two switches being operated in an opened state, the two switches being configured to, depending upon a switching position of the two switches of a respective battery module, connect battery cells of the respective battery module to a corresponding battery string and conductively bridge the respective battery module into the battery string.

5. At least one of a hybrid car and electric car comprising:
   a drive system, the drive system comprising:
      an electric motor having a plurality of phase connectors;
      a traction battery configured to supply the electric motor, the traction battery comprising a plurality of battery strings having an adjustable output voltage, each battery string being configured to generate alternating current signals at a first predetermined frequency that are phase-offset with respect to one another and configured supply energy to one of the plurality of phase connectors of the electric motor;
      an asynchronous machine configured to extend a range of the electric vehicle by charging the traction battery in response to a control signal, the asynchronous machine having a plurality of phase connectors each connected directly to one of the plurality of battery strings;
      an internal combustion engine configure to drive the asynchronous machine; and
      a control unit operatively connected to the asynchronous machine and the electric motor, the control unit being configured to:
         activate the internal combustion engine to drive the asynchronous machine; and
         regulate a rotational speed of the asynchronous machine to rotate the asynchronous machine at a second frequency that is at a predetermined ratio of the first frequency of the alternating current signals from the battery strings, the predetermined ratio being greater than 1 to enable an output signal from each phase connector in the asynchronous machine to drive the electric motor and charge one battery string in the plurality of battery strings.

\* \* \* \* \*